United States Patent Office 3,629,471
Patented Dec. 21, 1971

3,629,471
TRANQUILIZING COMPOSITIONS AND METHODS
Albert Fanchamps, Basel, and Max Taeschler, Reinach Basel Land, Switzerland, assignors to Sandoz Ltd. (also known as Sandoz AG), Basel, Switzerland
No Drawing. Filed Jan. 7, 1969, Ser. No. 789,621
Claims priority, application Switzerland, Jan. 16, 1968, 647/68
Int. Cl. A61k 27/00
U.S. Cl. 424—247                                       6 Claims

ABSTRACT OF THE DISCLOSURE

The invention relates to a pharmaceutical composition incorporating as active ingredients:
(a) N-ethyl-nortropin-benzhydryl ether or a pharmaceutically acceptable acid addition salt thereof;
(b) dihydroergocristine or a pharmaceutically acceptable acid addition salt thereof; and
(c) 3 - methylsulphinyl - 10 - [2-(1-methyl-2-piperidyl) ethyl]phenothiazine or a pharmaceutically acceptable acid addition salt thereof; in which the proportion, by weight, of ingredient (a):(b):(c) is from about 1:0.25:1.5: to about 1:20:125.
The composition is useful as a minor tranquilizer.

The present invention relates to pharmaceutical compositions.
More particularly, the present invention provides a pharmaceutical composition useful as a minor tranquilizer incorporating as active ingredients a therapeutically effective amount of (a) N-ethyl-nortropin-benzhydryl ether or a pharmaceutically acceptable acid addition salt thereof;
(b) dihydroergocristine or a pharmaceutically acceptable acid addition salt thereof; and
(c) 3-methylsulphinyl-10-[2-(1-methyl-2-piperidyl)ethyl] phenothiazine or a pharmaceutically acceptable acid addition salt thereof; in which the proportion, by weight, of ingredient (a):(b):(c) is from about 1:0.25: 1.5: to about 1:20:125.

The composition may be produced by mixing the active constituents indicated above and optionally adding one or more carrier materials.

N-ethyl-nortropin-benzhydryl ether, for which the international name "ethybenzatropine" is hereinafter used, is a synthetic tropane derivative having an anticholinergic effect, and which differs from atropine by a clear predominance of the central effects over the peripheral effects.

Dihydroergocristine, a hydrogenated ergot alkaloid of the ergotoxine group, exhibits adrenolytic and vasodilator effects, lowers the blood pressure and inhibits central circulatory reflexes.

3 - methylsulphinyl - 10 - [2 - (1 - methyl - 2 - piperidyl)ethyl]phenothiazine, which is hereinafter named "mesoridazine," is a neuroleptic of the phenothiazine series having a strong antiemotional effect.

The weight ratio of the active constituents ethybenzatropine, dihydroergocristine and mesoridazine preferably amounts to about 1:1:10 to about 1:4:20, for example about 1:2.5:15.

The active constituents are preferably used in the form of their water-soluble, physiologically acceptable salts, especially as hydrochlorides, hydrobromides, sulphates, methanesulphonates, benzenesulphonates or tartrates. Ethybenzatropine may, for example, be used as hydrobromide, dihydroergocristine as methanesulphonate, and mesoridazine as benzenesulphonate.

A single dose of the composition may, for example, have the following composition:
ethybenzatropine hydrobromide: 0.25 mg. (corresponding to 0.2 mg. of base)
dihydroergocristine methanesulphonate: 0.58 mg. (corresponding to 0.5 mg. of base)
mesoridazine benzenesulphonate: 4.23 mg. (corresponding to 3 mg. of base).

It is to be understood that the invention extends to galenic preparations of the compositions of the invention, suitable for enteral or parenteral administration, e.g. tablets, dragées, capsules, suppositories, and injectable solutions. In order to produce such medicinal preparations, the mixture of active compounds may be worked up with the usual organic or inorganic, pharmacologically inert adjuvants; examples of such adjuvants are lactose, starch, polyvinyl pyrrolidone, stearic acid, sorbic acid, talcum, methylcellulose, alcohols, glycerin, and natural or hardened fats. The preparations may furthermore contain suitable sweetening or colouring substances, and flavourings.

| Example of a galenic preparation: | Dragées, g. |
|---|---|
| ethybenzatropine hydrobromide | +0.00025 |
| dihydroergocristine methanesulphonate | ++0.00058 |
| mesoridazine benzenesulphonate | +++0.00423 |
| polyvinyl pyrrolidone | 0.00200 |
| talcum | 0.00260 |
| maize starch | 0.00800 |
| lactose | 0.03234 |
| kernel | 0.05000 |
| coating mass | 0.015 |
| for a dragée of | 0.065 |

+Corresponds to 0.0002 g. of base.
++Corresponds to 0.0005 g. of base.
+++Corresponds to 0.003 g. of base.

Ethybenzatropine hydrobromide, dihydroergocristine methane-sulphonate, mesoridazine benzenesulphonate, polyvinyl pyrrolidone, lactose and part of the maize starch are mixed. The mixture is moistened with water and kneaded until it can be granulated. The talcum and the remainder of the maize starch are added to the dried and crushed granulate. The mixture is pressed into kernels, which are coated in accordance with known processes.

The pharmacological effects of the components are surprisingly modified by the combined administration of the anticholinergic ethybenzatropine with central effects, the adrenolytic dihydroergocristine with central effects, and the neuroleptic mesoridazine with anti-emotional effects. In particular, the motor-sedative effects of the neuroleptic mesoridazine are weakened, whereas its protective effect towards emotional reactions, which may manifest themselves in psychic and vegetative disorders of vagal or sympathetic nature, is increased. On the other hand the inhibiting effects of the anticholinergic ethybenzatropine or the adrenolytic dihydroergocristine on different vegetative disorders which are not of emotional nature, are increased.

The new combination preparation is therefore useful as a minor tranquilizer, especially in those instances where autonomic hyperactivity is manifest.

A suitable dose is one in which an average of 0.2 to 2 mg. of ethylbenzatropine, 0.5 to 4 mg. of dihydroergocristine and 3 to 25 mg. of mesoridazine are administered daily; it is preferred to administer perorally a daily dose of 1 to 3 (in severe cases up to 6) single doses having the composition indicated above, e.g. in the form of dragées, as described in the above example of a galenic preparation.

The new combination preparation was clinically tested on 175 patients with vegetative instability or psychosomatic disorders. The treatment was effected with one dragée set forth on page 3 twice or thrice daily and had an average duration of three weeks; the results were considered very good in 52 cases (30%) and good in 86 cases (49%), whereas the number of moderate results only amounted to 20 (11.5%) and that of the failures only to 17 (9.5%). The preparation was furthermore excellently tolerated and it showed practically no side effects. As indicated above, the compositions of the invention are therefore excellently tolerated medicaments with reliable effects in the treatment of psychomotor vegetative disorders.

What is claimed is:

1. A pharmaceutical composition useful as a minor tranquilizer incorporating as active ingredients a therapeutically effective amount of
   (a) N-ethyl-nortropin-benzhydryl ether or a pharmaceutically acceptable acid addition salt thereof;
   (b) dihydroergocristine or a pharmaceutically acceptable acid addition salt thereof; and
   (c) 3 - methylsulphinyl - 10 - [2 - (1 - methyl - 2 - piperidyl)ethyl]phenothiazine or a pharmaceutically acceptable acid addition salt thereof; in which the proportion, by weight, of ingredient $(a):(b):(c)$ is about 1:2.5:15.

2. A pharmaceutical composition useful as a minor tranquilizer according to claim 1, in unit dose form, in which the amounts of basic ingredients (a), (b), and (c) contained in the composition are about 0.2 mg., 0.5 mg. and 3 mg. respectively.

3. A pharmaceutical composition useful as a minor tranquilizer according to claim 1, in which the ingredient (a) is in the form of its hydrobromide, the ingredient (b) is in the form of its methanesulphonate, and the ingrident (c) is in the form of its benzenesulphonate.

4. A pharmaceutical composition useful as a minor tranquilizer according to claim 3, in unit dose form, in which the amounts of the ingredients (a), (b), and (c) contained in the composition are about 0.25 mg., 0.58 mg. and 4.23 mg. respectively.

5. A method of treating a patient for autonomic hyperactivity, which comprises administering to the patient a therapeutically effective amount of the pharmaceutical composition of claim 1.

6. A method of treating a patient for autonomic hyperactivity according to claim 5, which comprises orally administering to the patient a daily dose of from about 0.2 to about 2 mg. of ingredient (a), from about 0.5 to about 4 mg. of ingredient (b), and from about 3 to about 25 mg. of ingredient (c).

References Cited

Hummel et al., Chem. Abst., 68, p. 94562, p. (1968).
Renz et al., Chem. Abst., 67, pp. 219236–32924 a (1967).
Douglas et al., Chem. Abst., 66, p. 93886 v (1967).
Vanden Driessche et al., Chem. Abst., 63, p. 8931 a (1965).
Merck Index, 7th ed. (1960), pp. 136–137.
A Psychiatric Glossary, 3rd ed. 1969.
Psychopharmacological Agents, Gordon, vol. II, (1967), pp. 222–223 and 230.

STANLEY J. FRIEDMAN, Primary Examiner

U.S. Cl. X.R.

424—261, 262, 265